United States Patent Office 2,994,151
Patented Aug. 1, 1961

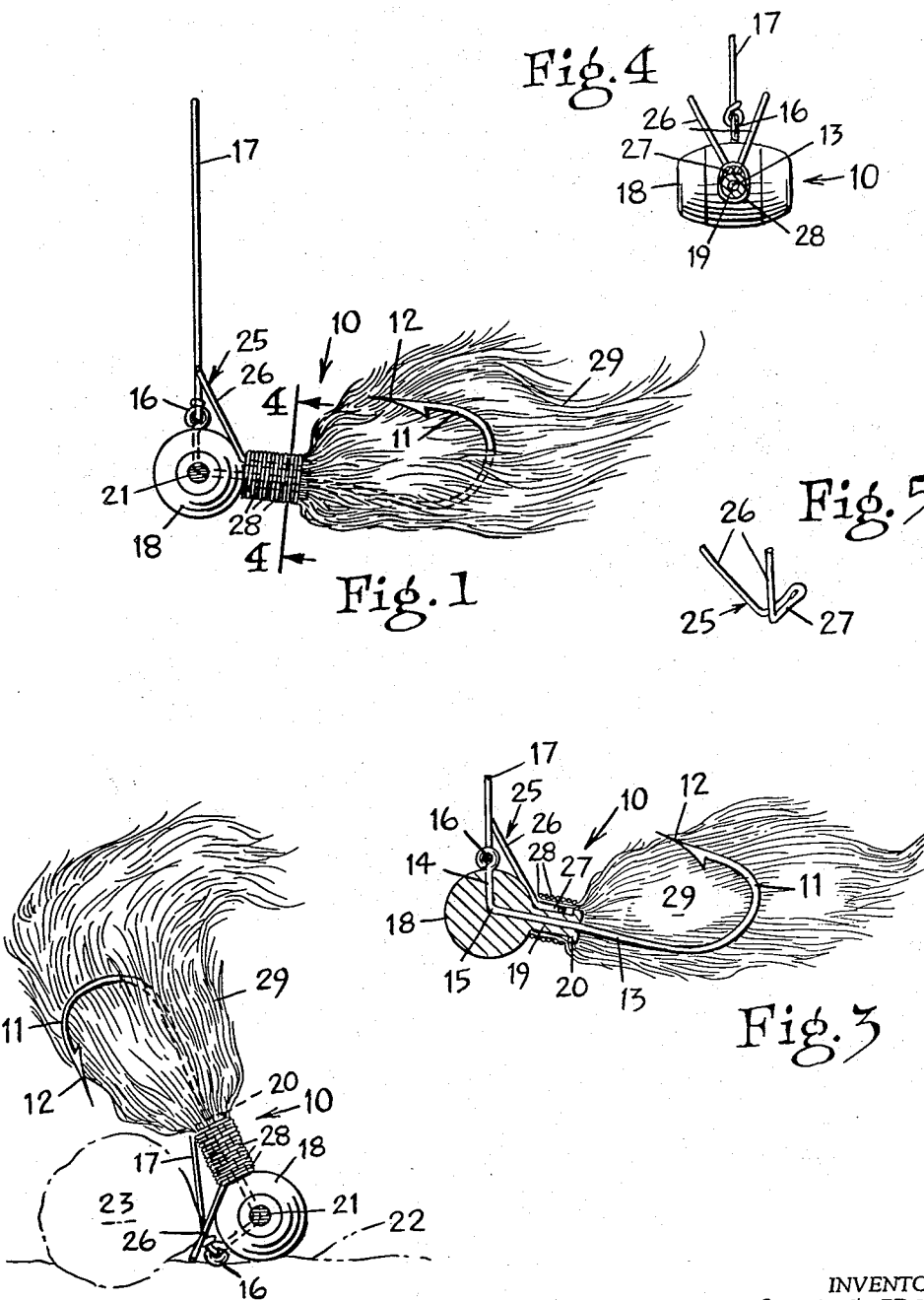

2,994,151
FISHING LURE
Sanford S. Webb, % Hank Webb Industries, Inc.,
524 Stahlman Bldg., Nashville, Tenn.
Filed Mar. 28, 1958, Ser. No. 724,661
7 Claims. (Cl. 43—42.28)

This invention relates to a fishing lure and more particularly to an ornamental fishing lure adapted to protect the point of a fish hook from damage or snagging.

One object of this invention is to provide a fishing lure incorporating a fish hook, the barbed point of which is adequately protected from engaging the bottom of a body of water in which the lure is disposed.

Another object of this invention is to provide a fishing lure incorporating a fish hook which is adapted not to engage the bottom or small obstacles lying on the bottom, even when the lure is overturned or upset.

A further object of this invention is to provide a fishing lure incorporating a fish hook in which the lower portion of the shank and barbed point of the hook are normally disposed toward a substantially horizontal position when the lure is freely suspended from a leader.

Another object of this invention is to provide a fishing lure incorporating a fish hook in which the upper portion of the shank is bent at substantially a right angle and a sinker is formed about the bent portion to concentrate the center of gravity of the lure proximate to the bent portion.

Another object of this invention is to provide an ornamental fishing lure in which the functional parts of the lure are so arranged as to give the lure the appearance of an insect.

Further objects and advantages of the invention will be apparent from the following description, taken in conjunction with the drawings, wherein:

FIG. 1 is a side elevation of the lure disclosing its normal position when freely suspended from a leader;

FIG. 2 is a side elevation of the lure in an upset position;

FIG. 3 is a side elevation of the invention disclosing the sinker and threads in section;

FIG. 4 is a section taken along the lines 4—4 of FIG. 1; and

FIG. 5 is a perspective view of the stabilizing prongs.

Referring now more particularly to the drawings, the lure 10 comprises a standard fish hook 11, having a barbed point 12, a lower shank portion 13 and an upper shank portion 14 which is bent at 15 at substantially right angles to the lower shank portion 13. The free end of the upper shank portion 14 terminates in an eyelet 16 which is adapted for attachment and free suspension from a leader 17.

Cast about the bent portion of the shank 15 and substantially the entire length of the upper shank portion 14 and a part of the lower shank portion 13 is a weighted sinker 18. The sinker 18 is substantially barrel-shaped having a stem 19 encasing the adjacent lower portion of the shank 13 and terminating in a flange 20. The axis of the barrel-shaped sinker is substantially perpendicular to the plane of the shank portions 13 and 14 and is sufficiently long to provide lateral stability to the lure 10. The barrel-shape of the sinker 18 is also adapted to resemble head of an insect, the ends of which may have eyes 21 painted thereon. The weight of the sinker 18 must be sufficient to concentrate the center of gravity of the entire lure as closely as possible to the center of gravity of the sinker itself, which approximately coincides with the bent portion 15, for the purpose of raising the lower portion of the shank 13 toward a horizontal position, as indicated in FIGS. 1 and 3. In this position the lure resembles an insect traveling through the water and it also is in a position to better protect the barbed point 12 from engagement with the bottom 22 of a body of water in which the lure 10 is disposed, or with obstacles 23 located on the bottom. In actual practice, sinker weights ranging from ⅛ to ⅝ ounce have been sucessfully employed.

Because of the circular cross-section of the sinker 18, there is a tendency for the lure to rotate about the axis of the sinker if the sinker should become stuck on the bottom 22 or engage an obstacle 23. If the lure was completely free to rotate, the barbed point 12 would be carried forward until it engaged the bottom 22 or an obstacle 23 on the bottom, and become damaged or snagged.

To limit rotation of the lure about the axis of the sinker and protect the barb from snagging the bottom 22 or an obstacle 23 thereon, a bi-furcated stabilizing device 25 is provided having a pair of diverging prongs 26 and provided with a shank or base 27 adapted to be fixedly secured to the stem 19 by any convenient means such as wrapped thread 28. The prongs 26 are adapted to originate from the stabilizing shank 27 substantially in the plane of the hook shank portions 13 and 14 and diverge outward from opposite sides of the plane over the sinker 18 to points substantially in the plane of the upper shank portion 14 and the axis of the sinker 18, as disclosed in FIGS. 1-3. The stabilizing device 25 may be formed from a single wire doubled back upon itself and bent in the shape disclosed in FIG. 5 to produce the prongs 26 and shank 27. The flange 20 is provided to prevent endwise motion of the stabilizing shank 27. The stabilizing device 25 is not only constructed to perform its function of limiting the rotation of the lure to a position shown in FIG. 2, but the prongs 26 are also adapted to resemble the antennae of an insect and positioned adjacent the sinker 18 which resembles the head of the insect.

In order to complete the resemblance of the lure to an insect and to camouflage and hide the lower portion of the shank 13 and the barbed point 12, a mass of hair 29, such as bear hair, is attached by the ends thereof by the same threads 28 which secure the stabilizing shank 27 around the stem 19. The free ends of the hair are adapted to flow indiscriminately about the bottom portion of the hook as disclosed in FIGS. 1, 2 and 3.

By terminating the prongs 26 in the vicinity of the plane of the upper shank portion 14 and the axis of the sinker 18, the prongs serve an additional function of protecting the barbed point 12 when the lure 10 is pulled upward by the leader 17. Specifically, when an obstacle, such as a tree limb, the edge of a boat dock or the side of a boat, engages the leader 17 above the hook 11, and the lure 10 is rising toward the obstacle, the drag of the hairs 29 in the water will cause the hook to rotate downward simultaneously moving the prongs 26 away from the leader 17 so that either or both of the rising prongs will engage the obstacle to pivot the lure 10 about the eyelet 16 and out of the path of the obstacle.

The invention therefore comprises a lure 10 integrally incorporating a sinker 18 and a fish hook 11 in a manner which will adequately protect the barbed point 12 from snagging and sticking in the bottom 22 of a body of water in which the lure is disposed and from snagging an obstacle above the lure when the lure is rising. The lure 10 is also well balanced and provided with adequate means for lateral stabilization and means to limit rotation of the lure to prevent snagging of the barbed point 12. In addition, the elements of the lure which are constructed and positioned for the functional purposes of protecting the barbed point, are also located and decorated in such a manner that they will cause the lure to resemble the appearance of an insect.

It will be apparent to those skilled in the art that various changes may be made in the invention, without departing from the spirit and scope thereof, and therefore the in-

What is claimed is:

1. A fishing lure comprising a fish hook having a shank and a curved bill extending from one end of said shank and terminating in a barbed point, a sinker fixed to the other end of said shank, means for attaching said sinker to a leader for free suspension of said lure, said attachment means being located on the same side of said shank as said barbed point and substantially in the plane of said hook containing said shank and barbed point, the weight of said sinker and the location of said attachment means being such that when said leader is vertical and freely suspends said lure said shank is substantially horizontal, prongs diverging in opposite directions from the plane of said hook and away from said bill, said prongs terminating at least in a plane containing the leader when said lure is freely suspended.

2. The invention according to claim 1 in which said sinker is substantially barrel-shaped having a longitudinal axis substantially normal to the plane of said hook.

3. A fishing lure comprising a fish hook having a shank and a curved bill terminating in a barbed point, said shank comprising a first portion extending from said bill and a second bent portion substantially normal to said first portion, means for attaching said second shank portion to a leader on the same side of said first portion as said barbed point for free suspension of said lure, said shank portions, barbed point and attachment means lying substantially in the same plane, a sinker fixed to the adjacent bent portions of said shank, the weight of said sinker being such that when said leader is vertical and freely suspends said lure said first shank portion is substantially horizontal, prongs fixed to said sinker and diverging uniformly in opposite directions from the plane of said shank portions and away from said bill, said prongs terminating at least in a plane containing the leader when said lure is freely suspended.

4. The invention according to claim 3 in which said prongs terminate in a plane tangent to said sinker, the longitudinal axis of said first shank portion forming an angle with said tangent plane of approximately 60°–90°.

5. The invention according to claim 3 in which said sinker is substantially barrel-shaped having a longitudinal axis substantially normal to the plane of said shank portions.

6. A fishing lure comprising a fish hook having a first shank portion terminating in a curved bill having a barbed point, a second shank portion connected substantially normal to the opposite end of said first shank portion from said bill and extending in the same plane of and on the same side of said first shank portion as said bill, an eyelet at the free end of said second shank portion for attachment to a leader, a substantially barrel-shaped sinker fixed to said first and second shank portions at their point of connection, the longitudinal axis of said sinker being normal to the plane of said shank portions, a stem integral with and extending from said sinker around said first shank portion and terminating in a flange, a stabilizing device having a base secured to said stem and having prongs diverging from the plane of said shank portions and away from said bill, the ends of said prongs being adapted to engage obstacles in the path of the lure when said lure is caused to rotate about the longitudinal axis of the sinker to prevent the barbed point of the hook from contacting the obstacles and hair fixed to said stem in such a manner as to obscure said first shank portion and said bill.

7. The invention according to claim 6 in which thread means are provided for securing said base and said hair to said stem, in such a manner that the prongs resemble the antennae of an insect.

References Cited in the file of this patent

UNITED STATES PATENTS

| | | |
|---|---|---|
| 2,315,304 | Upperman | Mar. 30, 1943 |
| 2,523,949 | Gambill | Sept. 26, 1950 |
| 2,589,007 | Landon | Mar. 11, 1952 |
| 2,778,144 | Jones et al. | Jan. 22, 1957 |
| 2,787,859 | Bay | Apr. 9, 1957 |
| 2,795,886 | Johnson | June 18, 1957 |

FOREIGN PATENTS

| | | |
|---|---|---|
| 574,630 | Great Britain | Jan. 14, 1946 |